(12) United States Patent
Bennett

(10) Patent No.: US 6,634,486 B2
(45) Date of Patent: Oct. 21, 2003

(54) DISTRIBUTING APPARATUS HAVING TAPERED ROLLERS

(75) Inventor: Robert Bennett, West Midlands (GB)

(73) Assignee: Ishida Co. Limited, Kyoto (JP)

( * ) Notice: Subject to any disclaimer, the term of this patent is extended or adjusted under 35 U.S.C. 154(b) by 0 days.

(21) Appl. No.: 10/180,093

(22) Filed: Jun. 27, 2002

(65) Prior Publication Data

US 2003/0015401 A1 Jan. 23, 2003

(30) Foreign Application Priority Data

Jul. 3, 2001 (GB) .............................. 0116266
Jul. 11, 2001 (GB) .............................. 0116941

(51) Int. Cl.[7] .............................................. B65G 21/10
(52) U.S. Cl. ..................................... 198/631.1; 198/785
(58) Field of Search .............................. 198/631.1, 785, 198/786, 787, 788, 789, 784, 448, 456

(56) References Cited

U.S. PATENT DOCUMENTS

| | | | | |
|---|---|---|---|---|
| 5,472,080 A | * | 12/1995 | Fukuoka ..................... | 198/817 |
| 5,711,980 A | * | 1/1998 | Terry .......................... | 426/392 |
| 6,170,637 B1 | * | 1/2001 | Ishii ........................... | 198/443 |
| 6,253,905 B1 | * | 7/2001 | Pelka .......................... | 198/456 |
| 6,367,617 B1 | * | 4/2002 | Schiesser et al. ........... | 198/782 |
| 6,390,277 B2 | * | 5/2002 | Pelka .......................... | 198/456 |
| 6,390,286 B1 | * | 5/2002 | Nguyen et al. ........ | 198/781.08 |

FOREIGN PATENT DOCUMENTS

| | | |
|---|---|---|
| EP | 0667289 A1 | 8/1995 |
| GB | 2050987 A | 1/1981 |
| WO | WO 95/32123 | 11/1995 |

* cited by examiner

Primary Examiner—Christopher P. Ellis
Assistant Examiner—Rashmi Sharma
(74) Attorney, Agent, or Firm—Staas & Halsey LLP

(57) ABSTRACT

An apparatus to evenly distribute loose articles within a package. The apparatus includes a conveyor unit to convey and agitate the package and a pressing unit to press on and thereby smooth the package. The conveyor unit includes a plurality of tapered rollers which are tapered on alternating sides.

22 Claims, 3 Drawing Sheets

DISTRIBUTING APPARATUS HAVING TAPERED ROLLERS

CROSS-REFERENCE TO RELATED APPLICATIONS

This application claims priority to UK Application No. 0116941.6, filed Jul. 11, 2001, the disclosure of which is incorporated herein by reference. This application also claims priority to UK Application No. 0116266.8, filed Jul. 3, 2001, the disclosure of which is incorporated herein by reference.

BACKGROUND OF THE INVENTION

1. Field of the Invention

The present invention relates to an apparatus to evenly distribute loose articles within a package. More particularly, the present invention relates to an apparatus to distribute loose particles having a conveyer unit to move and agitate a package, the conveyor unit having rollers tapered in opposite directions.

2. Description of the Related Art

A known apparatus to distribute particles is illustrated in WO-A-95/32123. In this reference, a conveyor includes an elongate conveyor belt mounted on rollers which have one or more surface eccentricities to agitate a package moving thereon. This apparatus is disadvantageous because distribution of articles is slow and inefficient.

SUMMARY OF THE INVENTION

Accordingly, it is an object of the present invention to provide an apparatus to distribute articles which is faster and more efficient than know designs.

It is another object of the present invention to provide an apparatus which reduces the chances of compromised product tests or damaged products.

It is still another object of the present invention to provide an apparatus which can receive a large variation in package size and height without the need for adjustments.

Additional objects and advantages will be set forth in part in the description which follows and, in part will be obvious from the description, or may be learned by practice of the invention.

The foregoing and other objects of the present invention are achieved by providing an apparatus to evenly distribute loose articles within a package, the apparatus including a conveyor conveying the package, including a plurality of tapered rollers spaced side-by-side in a direction of conveying the package, the tapered rollers agitating the articles as a result of the conveying; and a pressing unit to press on the package during the agitation to smooth the package.

The foregoing and other objects of the present invention are also achieved by providing an apparatus to evenly distribute loose articles within a package, the apparatus including a conveyor moving the package in a feed direction of the package, the conveyor including a plurality of tapered rollers to agitate the articles as a result of the moving of the package.

The foregoing and other objects of the present invention are also achieved by providing a method to evenly distribute loose articles within a package, the method including providing a conveyor comprising a plurality of tapered rollers; and moving the package on the tapered rollers in a feed direction of the package, including agitating the articles with the tapered rollers.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
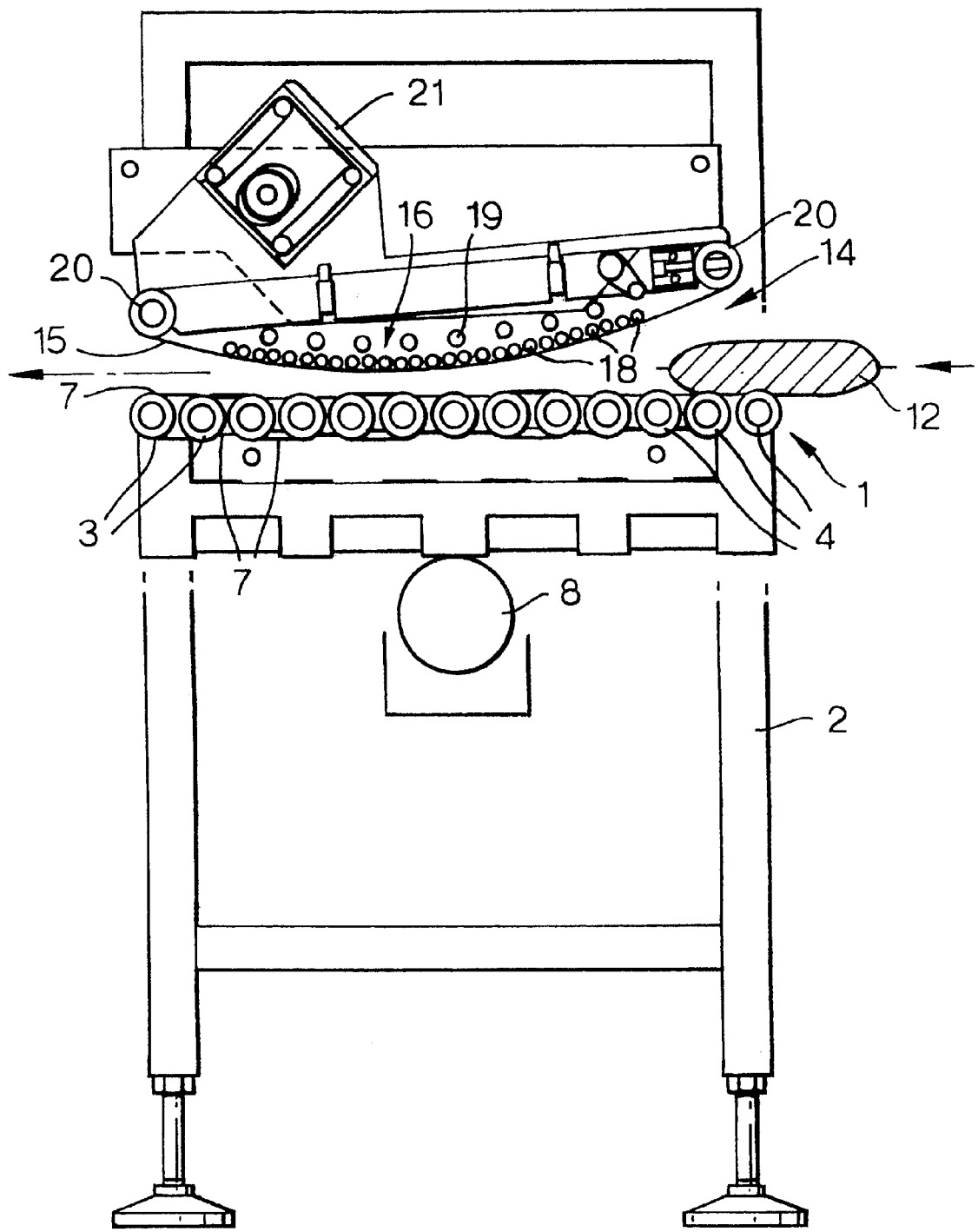
FIG. 1 is a schematic side elevational view of an embodiment of the present invention.
Figure 2:
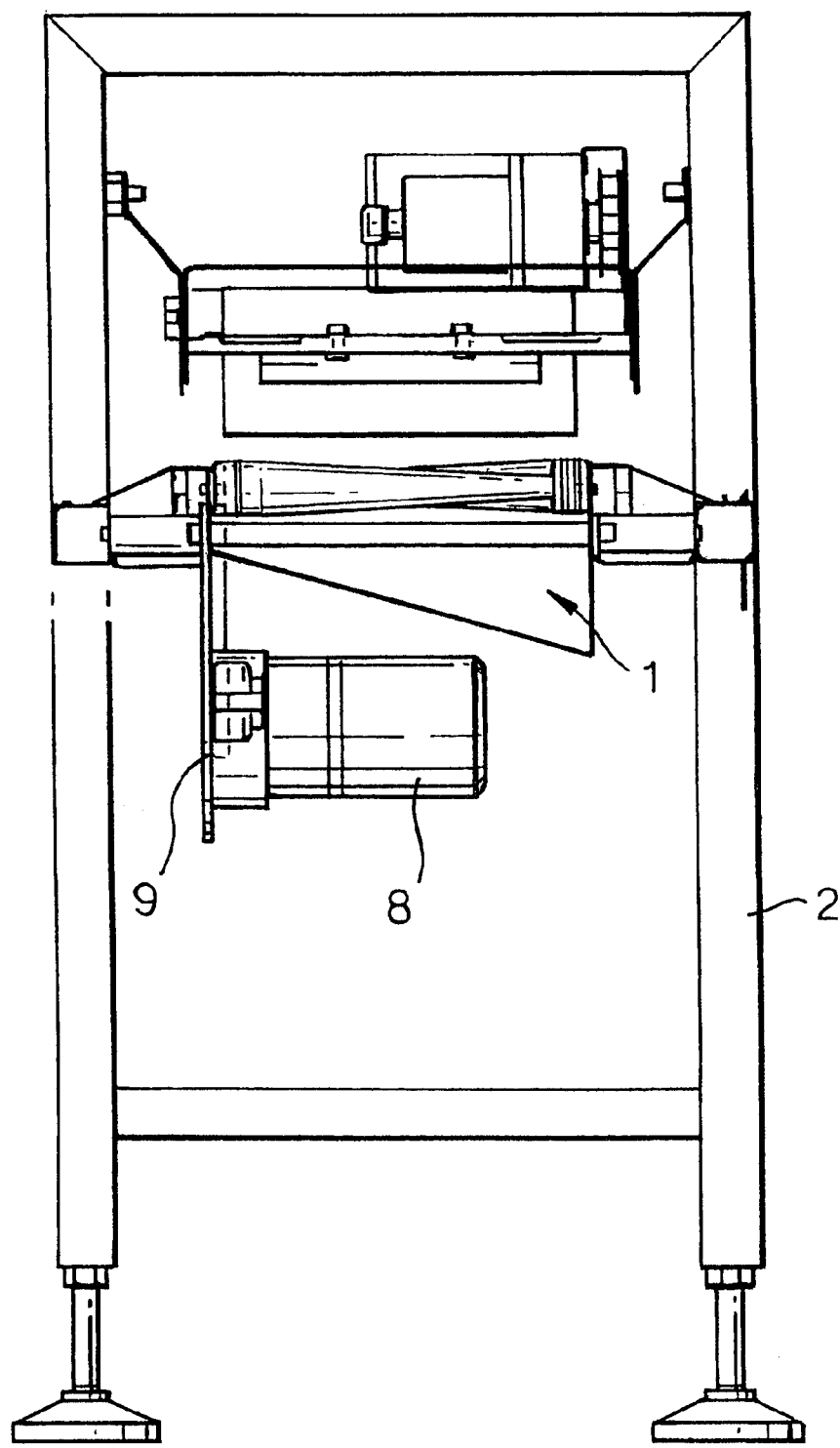
FIG. 2 is a schematic end view of the apparatus of FIG. 1.

Reference will now be made in detail to the present preferred embodiments of the present invention, examples of which are illustrated in the accompanying drawings, wherein like reference numerals refer to like elements throughout.

FIG. 1 is a schematic side elevational view of an embodiment of the present invention, which can be incorporated into a production line.

The apparatus of FIG. 1 includes a frame 2 to support a first conveyor 1, which conveys packages 12 in a horizontal direction. As an example, the packages 12 may be flexible pillow type bags filled with articles such as chips or other snack foods.

Figure 4:
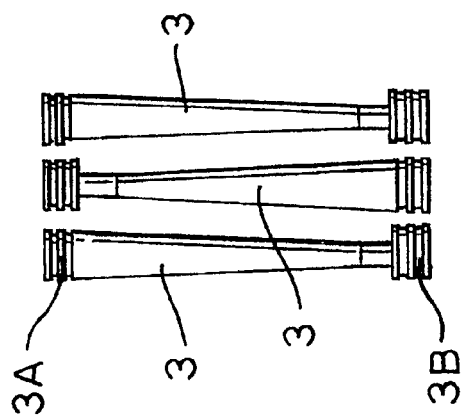
FIG. 4 illustrates three of the rollers of FIG. 3.
Figure 3:
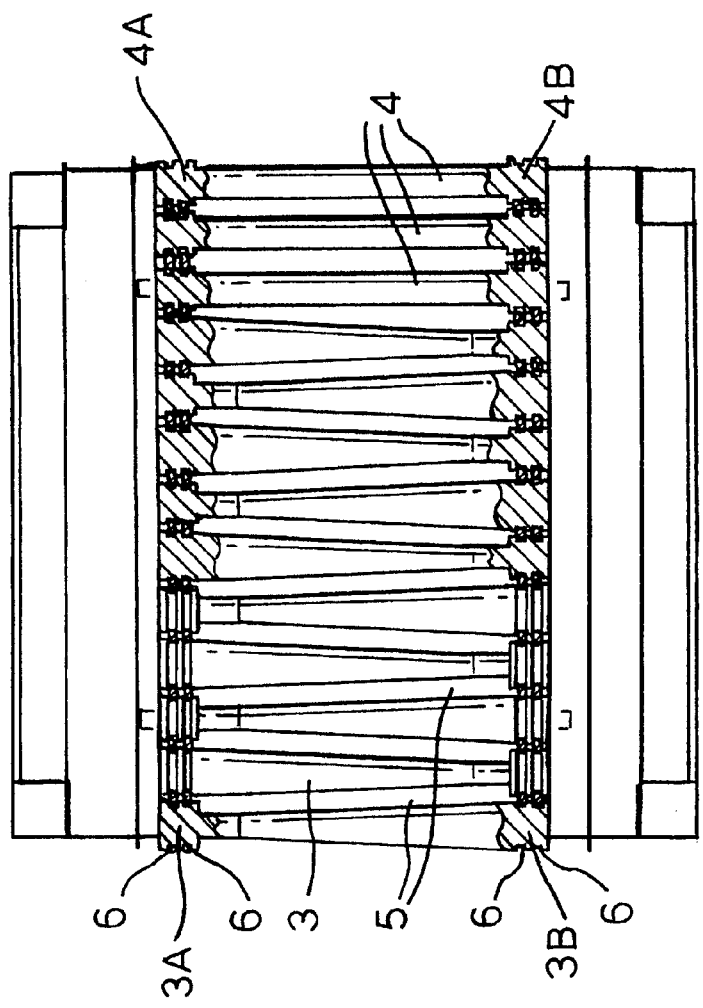
FIG. 3 is a plan view of the roller bed of the apparatus of FIG. 1.

The first conveyor 1 includes a set of tapered rollers 3 (shown in greater detail in FIGS. 3 and 4) and a set of cylindrical rollers 4 at an upstream end of the first conveyor 1. As can be seen in FIGS. 3 and 4, the tapered rollers 3 are arranged such that adjacent rollers 3 are tapered on alternating sides, and gaps 5 are formed therebetween. Any debris generated during passage of the packages 12 through the apparatus will thus drop down through the gaps 5 to be collected in a bin (not shown).

Each end of the rollers 3,4 is formed by a cylindrical boss 3A,3B,4A,4B, each being provided with a pair of grooves 6. In order to couple a drive force to all of the rollers 3, 4, adjacent pairs of the rollers 3, 4 are linked by a drive belt located in respective, parallel grooves in adjacent bosses 3A and 4A or 3B and 4B. Furthermore, both ends of each of the rollers 3, 4 can be linked by a drive belt for additional security. Although this drive belt/groove arrangement is described herein, other methods of coupling the rollers 3,4 are possible and will be obvious to those skilled in the relevant art.

The rollers 3,4 are driven by a motor 8 coupled via a main belt 9 to the endmost roller 4. When activated, the motor 8 will drive the endmost roller 4, which in turn, via the drive belts 7, will cause the other rollers 3,4 in the first conveyor 1 to be driven in the feed direction. Although this main belt/motor arrangement is described herein, other methods of coupling the rollers 3,4 and the motor 8 are possible and will be obvious to those skilled in the relevant art.

The packages 12 are moved along the first conveyor 1 and are agitated in both the feed direction and orthogonal to the feed direction as a result of the tapered nature of the rollers 3. Thus, there is redistribution of loose articles within the packages 12. Specifically, the packages 12 are agitated by a waddling action.

The tapered rollers 3 may have a diameter ranging, for example, from 50 mm at the thick end down to 25 mm at the thin end, and a length of about 200 mm. These dimensions are described for purposes of example, only, and thus these dimensions may vary. A typical feed rate may be 60 m/min, or anywhere in the range of 50–65 m/min. However, the present invention is not limited to any particular feed rate.

Although the agitation at the surface of the first conveyor 1 provides the energy for the articles to move within the packages 12, a unit to gently smooth the packages 12 further provides an even distribution. It is important that this smoothing is not so severe as to crush the articles or damage the packages 12.

In order to achieve the smoothing, a second conveyor 14 is located above the first conveyor 1. The second conveyor 14 is fitted with, for example, an elasticated conveyor belt 15 to be stretched and hung down from pulleys 20. Although an elasticated conveyor is described herein, it will be readily understood that other stretchable elements may be used.

A catenary pressing element 16 stretches the conveyor belt 15 downward in a catenary shape. The pressing element 16 includes a series of transversely-elongate platform weights 19, pivotally linked to one another edge-to-edge, positioned within the second conveyor 14 and supported at either end by fixed supports (not shown). The pressing element 16 hangs from the supports and rests on the inside of the lower run of the elasticated conveyor belt 15 via a series of low-friction rollers 18. The rollers 18 may be "low back line pressure" conveyor chains, for example, from Rexnord Corp. or Unichain (of Great Britain). Alternately, any type of low-friction conveying device may be used. The belt 15 is driven by a motor 21. The second conveyor 14 and the first conveyor 1 runs at a substantially same speed to aid in the redistribution of articles. Although two motors have been used in this example, it would also be possible to use a single motor in place of the motors 8, 21 to drive both the conveyor 1 and the belt 15.

Thus, there is disclosed an apparatus in which the combined action of the second conveyor 14 and the undulating surface of the tapered rollers 3 displaces the articles inside the packages 12 and also smoothes out the packages 12, thereby removing creases and deformations. Thus, the packages 12 are consistent in shape, and the contents are evenly spread. This allows the packages 12 to be processed or handled more quickly and efficiently downstream by such equipment as pick and place systems or seal testing equipment. In particular, the seal tester requires paper settling in order to perform a hood test. This is especially true if the test takes the form of a plate, roller plate or a flat belt which is placed on the package 12 to check the high under pressure for a duration of time. Damage to the articles is also reduced during such testing. If the product is bunched together in one area of the package 12 or a large piece of product is sticking up, this test is compromised. For example, if the package 12 is a bag, the result may be a broken bag. The present invention greatly reduces the chances of comprised tests or damaged product.

The apparatus can receive a large variation in package size and height without the need for adjustments. Thus, the present invention is not limited to a particular size, shape or weight of the packages 12. The roller bed allows the removal of debris from broken packages 12, or product from a previous process. To assist in the removal of debris, the rollers may be spaced wider in order to allow larger particles to fall through. The apparatus can also stabilize packages 12 which may be bouncing during entry.

The first conveyor 1 and second conveyor 14 are described as including belts, pulleys, etc. However, the present invention is not limited to any particular type of conveyor, or any specific conveyor configuration.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. An apparatus to evenly distribute loose articles within a package, the apparatus comprising:
    a conveyor conveying the package, comprising a plurality of tapered rollers spaced side-by-side in a direction of conveying the package, the tapered rollers agitating the articles as a result of the conveying; and
    a pressing unit to press on the package during the agitation to smooth the package.

2. The apparatus according to claim 1, wherein each of the tapered rollers is tapered on an opposite side as the adjacent tapered roller.

3. The apparatus according to claim 1, further comprising a plurality of cylindrical rollers provided upstream from the tapered rollers in the direction of conveying the package to feed the packages to the tapered rollers.

4. The apparatus according to claim 3, wherein the cylindrical rollers are commonly driven with the tapered rollers.

5. The apparatus according to claim 1, wherein the tapered rollers are spaced apart to leave gaps through which debris from the package falls.

6. The apparatus according to claim 1, wherein the tapered rollers are drivingly linked in pairs.

7. The apparatus according to claim 1, wherein the pressing unit is flexible.

8. The apparatus according to claim 1, wherein the pressing unit comprises a flexible layer to contact the package.

9. The apparatus according to claim 8, wherein the pressing unit further comprises a series of independently movable weights above the flexible layer to stretch the flexible layer into a catenary shape.

10. The apparatus according to claim 9, wherein the pressing unit further comprises a plurality of pressing rollers,
    wherein the series of weights act on the flexible layer via the pressing rollers.

11. The apparatus according to claim 1, wherein a portion of the pressing unit which contacts the package is moveable in the direction of conveying the package to thereby reduce damaging interference with the package during contact thereof.

12. The apparatus according to claim 8, wherein the flexible layer has a catenary shape.

13. An apparatus to evenly distribute loose articles within a package, the apparatus comprising:
    a conveyor moving the package in a feed direction of the package, the conveyor comprising a plurality of tapered rollers to agitate the articles as a result of the moving of the package.

14. The apparatus according to claim 13, wherein the tapered rollers agitate the package in a direction orthogonal to the feed direction.

15. The apparatus according to claim 13, further comprising a pressing unit to press on and thereby smooth the package.

16. The apparatus according to claim 14, wherein the package is agitated by a waddling action.

17. The apparatus according to claim 15, wherein the pressing unit comprises a conveyor belt moving at a same speed as the conveyor unit.

18. The apparatus according to claim 13, wherein the tapered rollers agitate the package in the feed direction.

19. A method to evenly distribute loose articles within a package, the method comprising:

providing a conveyor comprising a plurality of tapered rollers; and moving the package on the tapered rollers in a feed direction of the package, comprising agitating the articles with the tapered rollers.

20. The method according to claim 19, wherein the agitating comprises:

agitating the package with the tapered rollers in a direction orthogonal to the feed direction; and smoothing the package.

21. An apparatus comprising:

a conveyer comprising rollers to convey a package, the rollers having a tapered shape which causes articles inside the package to be agitated as the package is conveyed; and a presser pressing on the package while the package is agitated, to smooth the package.

22. An apparatus comprising:

a conveyer comprising rollers to convey a package, the rollers having a tapered shape which causes articles inside the package to be agitated as the package is conveyed; and means for pressing on the package while the package is agitated, to smooth the package.

* * * * *